US010718240B2

(12) United States Patent
Hauvespre et al.

(10) Patent No.: US 10,718,240 B2
(45) Date of Patent: *Jul. 21, 2020

(54) CAM FOLLOWER ROLLER DEVICE WITH LUBRICANT SUPPLY HOLES AND LUBRICATING METHOD

(71) Applicant: Aktiebolaget SKF, Gothenburg (SE)

(72) Inventors: Benoit Hauvespre, Saint Etienne de Chigny (FR); Benoit Arnault, Saint-Cyr-sur-Loire (FR); Nicolas Berruet, Artannes sur Indre (FR); Guillaume Jouanno, Plouha (FR); Samuel Viault, Saint-Antoine-du-Rocher (FR)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/346,073

(22) Filed: Nov. 8, 2016

(65) Prior Publication Data
US 2017/0145877 A1    May 25, 2017

(30) Foreign Application Priority Data

Nov. 24, 2015  (EP) .................................... 15306857

(51) Int. Cl.
F01L 1/14    (2006.01)
F01M 9/10   (2006.01)
F02M 63/00  (2006.01)
F02M 59/44  (2006.01)
F02M 59/10  (2006.01)
(Continued)

(52) U.S. Cl.
CPC ............... F01M 9/105 (2013.01); F01L 1/14 (2013.01); F02M 59/102 (2013.01); F02M 59/44 (2013.01); F02M 63/0001 (2013.01); F16H 53/06 (2013.01); F01L 1/18 (2013.01); F01L 2105/00 (2013.01); F01L 2810/02 (2013.01)

(58) Field of Classification Search
CPC .......... F01M 9/104; F01M 9/105; F01L 1/14; F16H 53/06; F02M 59/102
See application file for complete search history.

(56) References Cited

U.S. PATENT DOCUMENTS 1,802,330 A * 4/1931 Boland ..................... F01L 1/14
                                                      123/90.5
4,231,267 A * 11/1980 Van Slooten ........... F01L 1/245
                                                     123/90.48
6,216,583 B1 * 4/2001 Klinger ................ F02M 59/102
                                                      123/90.35
(Continued)

FOREIGN PATENT DOCUMENTS

CN    102959227 A    3/2013
DE    102006031032 A1   1/2008
(Continued)

Primary Examiner — Richard W Ridley
Assistant Examiner — Brian J McGovern
(74) Attorney, Agent, or Firm — Garcia-Zamor Intellectual Property Law, LLC; Ruy Garcia-Zamor; Bryan Peckjian

(57) ABSTRACT

The cam follower roller device provides a tappet body, a pin mounted into the tappet body, and a roller mounted on the pin and provided with an outer surface and with end faces, axially delimiting the outer surface. At least one lubricant supply through-hole is formed into the thickness of the tappet body and locally faces an edge of the roller delimited between the outer surface and one of the end faces.

12 Claims, 3 Drawing Sheets

(51) Int. Cl.
*F16H 53/06* (2006.01)
*F01L 1/18* (2006.01)

(56) References Cited

U.S. PATENT DOCUMENTS

| | | | | |
|---|---|---|---|---|
| 6,688,269 | B1* | 2/2004 | Steinmetz | F01L 1/14 |
| | | | | 123/90.48 |
| 8,851,038 | B1 | 10/2014 | Iskenderian | |
| 9,441,505 | B1* | 9/2016 | Popp | F01L 1/14 |
| 9,726,270 | B2* | 8/2017 | Berruet | F04B 1/0426 |
| 9,752,670 | B2* | 9/2017 | Berruet | F16H 53/06 |
| 9,790,818 | B2* | 10/2017 | Berruet | F02M 59/102 |
| 2001/0004886 | A1 | 6/2001 | Brothers | |
| 2008/0190237 | A1* | 8/2008 | Radinger | F01L 1/143 |
| | | | | 74/569 |
| 2013/0104730 | A1* | 5/2013 | Maier | F02M 59/102 |
| | | | | 92/61 |
| 2015/0300476 | A1* | 10/2015 | Berruet | F04B 1/0426 |
| | | | | 74/569 |
| 2016/0091073 | A1* | 3/2016 | Berruet | F16H 53/06 |
| | | | | 74/559 |
| 2016/0153321 | A1* | 6/2016 | Berruet | F02M 59/102 |
| | | | | 123/90.44 |
| 2016/0153322 | A1* | 6/2016 | Berruet | F02M 59/102 |
| | | | | 74/559 |
| 2016/0160986 | A1* | 6/2016 | Berruet | F02M 59/102 |
| | | | | 74/569 |
| 2016/0281667 | A1* | 9/2016 | Berruet | F02M 59/102 |

FOREIGN PATENT DOCUMENTS

| | | |
|---|---|---|
| DE | 102010030498 A1 | 12/2011 |
| DE | 102012223413 A1 | 6/2014 |
| EP | 2937566 A1 | 10/2015 |
| WO | 2008068116 A1 | 6/2008 |

* cited by examiner

CAM FOLLOWER ROLLER DEVICE WITH LUBRICANT SUPPLY HOLES AND LUBRICATING METHOD

CROSS REFERENCE TO RELATED APPLICATIONS

This application claims priority to European patent application no. 15306857.2 filed on Nov. 24, 2015, the contents of which are fully incorporated herein by reference.

FIELD OF THE INVENTION

The present invention relates to the field of cam follower roller devices used in automotive or industrial applications. One advantageous application of the invention is the use of the cam follower roller device in a fuel injection pump intended for an internal combustion engine, in particular of a motor vehicle. Another advantageous application of the invention is the use of the device in a rocker system intended for controlling valves of an internal combustion piston engine.

BACKGROUND OF THE INVENTION

Such a cam follower roller device generally provides an outer tappet body, a pin mounted on the tappet body and a roller movable in rotation relative to the pin around its axis. When the cam follower roller device is in service in a fuel injection pump, the roller collaborates with a cam synchronized with the internal combustion engine camshaft or crankshaft. The rotation of the camshaft, or crankshaft, leads to a periodic displacement of a piston of the pump that rests against the tappet body, to allow fuel to be delivered.

It is also known to provide the cam follower roller device with an insert as a stroke-transmission part mounted in the tappet body. EP-A1-2 853 738 describes a device comprising such an insert supporting the pin while the tappet body supports the insert.

For such cam follower roller devices, an oil supply is foreseen during the operation of the internal combustion engine for lubricating the contact zone between the pin and the roller as well as the outer surface of the roller.

Generally, oil through-holes are formed into the thickness of the tappet body to emerge at the vicinity of the outer surface of the pin. Grooves are also formed on the outer surface of the tappet body to delimit oil circulating paths and to obtain a flow of oil directed towards the outer surface of the roller.

The provision of through-holes and of outer grooves on the tappet body made of forged metal leads to an increase of the manufacturing costs of such a cam follower roller device.

One aim of the present invention is to overcome this drawback.

BRIEF SUMMARY OF THE INVENTION

It is a particular object of the present invention to provide a cam follower roller device with good reliability and cost-saving design.

In one embodiment, the cam follower roller device provides a tappet body, a pin mounted into the tappet body, and a roller mounted on the pin and provided with an outer surface and with end faces axially delimiting the outer surface. At least one lubricant supply through-hole is formed into the thickness of the tappet body and locally faces an edge of the roller delimited between the outer surface and one of the end faces.

With such lubricant supply through-hole integrated into the tappet body, a flow of lubricant may be directed straight towards the edge of the roller and divided into two separate part flows at this edge. A first part flow is directed towards the rolling contact area between the pin and the roller. A second part flow is directed towards the outer surface of the roller intended to be in contact with a cam. Accordingly, one lubricant supply through-hole enables the lubrication of two distinct zones of the device. This leads to a reduction of the manufacturing costs of the tappet body.

Preferably, an axis of the lubricant supply through-hole is oriented towards the edge of the roller. Advantageously, the lubricant supply through-hole partly faces the outer surface of the roller and/or the end face of the roller. The lubricant supply through-hole may be spaced apart from an upper face of the tappet body.

In one embodiment the lubricant supply through-hole extends into a radial plane of the device perpendicular to an axis of the tappet body. Alternatively, the lubricant supply through-hole may be tilted with respect to a radial plane of the device perpendicular to an axis of the tappet body. In this case, an angle is delimited between the axis of the hole and the plane. The angle may be a clockwise angle or a counter clockwise angle.

In one embodiment, the tappet body provides at least first and second lubricant supply through-holes formed into the thickness of the tappet body. The first lubricant supply through-hole locally faces the edge of the roller delimited between the outer surface and the end face while the second lubricant supply through-hole locally faces another edge of the roller delimited between the outer surface and the other end face.

It is also be possible to provide the tappet body with at least a pair of first lubricant supply through-holes and a pair of second lubricant supply through-holes. The through-holes of each pair may face one another. The two pairs of first and second lubricant supply through-holes may be symmetrical relative to an axial plane of the device passing through the centre of the roller.

In one embodiment, the device may further provide an insert mounted in the tappet body, the pin being mounted at least on the insert. Preferably, the insert provides a central core and at least two side tabs each comprising a receiving housing for an end of the pin. The tappet body may provide axial blocking means for maintaining the pin into the receiving housings.

In another embodiment, the pin is mounted on the tappet body.

The invention also relates to a method for lubricating a cam follower roller device comprising a tappet body, a pin mounted in the tappet body and a roller mounted on the pin and provided with an outer surface and with end faces axially delimiting the outer surface, wherein at least one flow of lubricant emerging from a lubricant supply through-hole formed into the thickness of the tappet body is directed towards an edge of the roller delimited between the outer surface and one of the end faces of the roller, and impacts the edge in order that a part of the flow is caused to flow towards the pin and that the other part of the flow is caused to flow towards the outer surface of the roller.

At least one additional flow of lubricant emerging from another lubricant supply through-hole formed into the thickness of the tappet body may be directed towards another edge of the roller delimited between the outer surface and the other end face of the roller, and may impact the another edge in order that a part of the additional flow is caused to flow towards the pin and that the other part of the additional flow is caused to flow towards the outer surface of the roller.

BRIEF DESCRIPTION OF THE SEVERAL VIEWS OF THE DRAWING

The present invention and its advantages will be better understood by studying the detailed description of specific embodiments given by way of non-limiting examples and illustrated by the appended drawings on which.

DETAILED DESCRIPTION OF THE INVENTION

Figure 2:
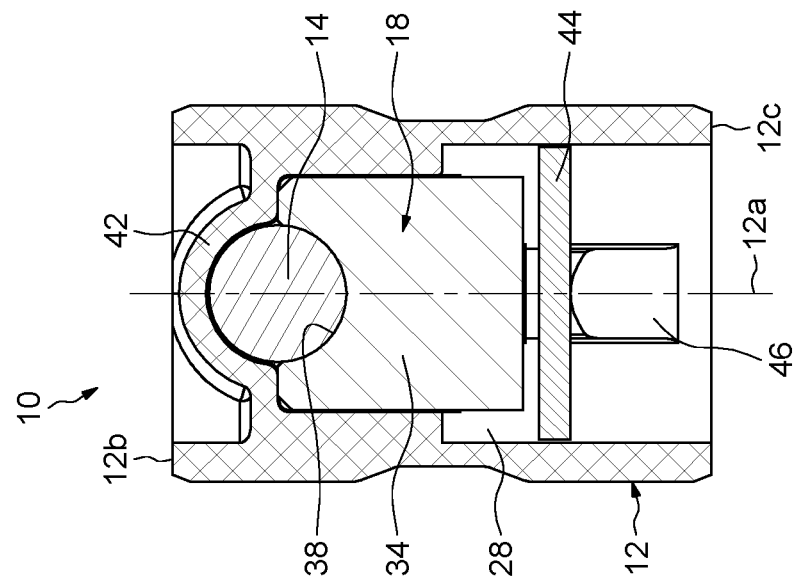
FIG. 2 is a section on II-II of FIG. 1.
Figure 1:
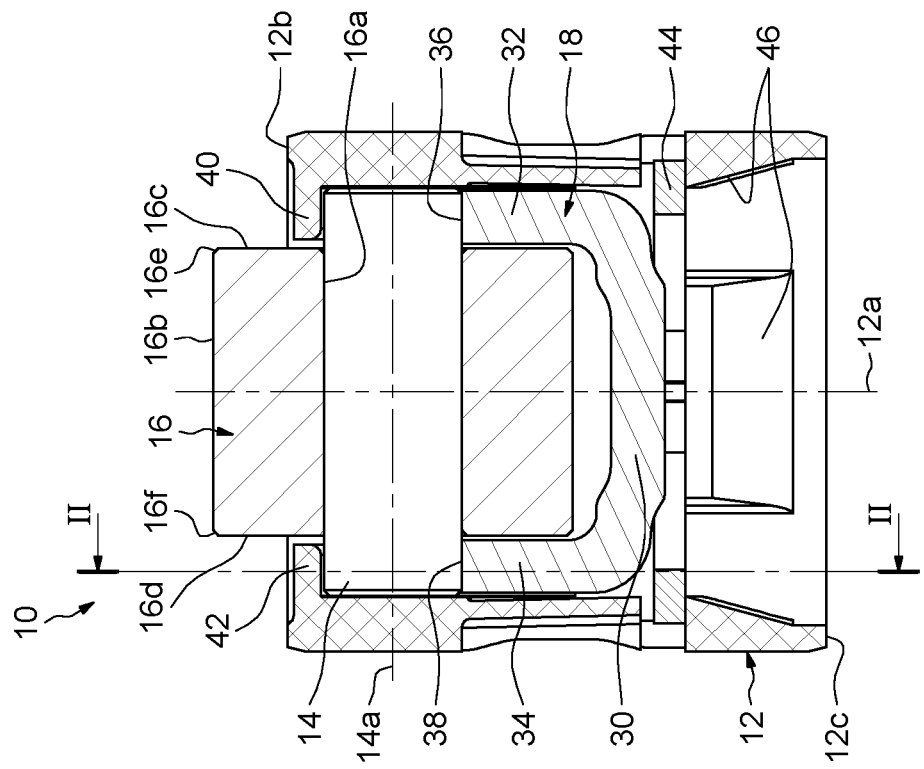
FIG. 1 is a cross-section of a cam follower roller device according to a first example of the invention.

As shown on FIGS. 1 and 2, a cam follower roller device 10 provides an outer tappet housing or body 12 extending along a central axis 12a, a shaft or pin 14 extending along a pin axis 14a perpendicular to the axis 12a, a roller 16 mounted on the pin and movable in rotation relative to the pin, and a stroke transmission part or insert 18 mounted in the tappet body. The insert 18 supports the pin 14 while the tappet body 12 supports the insert. As will be described later, lubricant supply through-holes 20, 22, 24, 26 (FIGS. 3 and 4) are provided on the tappet body 12 in order to lubricate both the roller 16 and the pin 14.

In the disclosed embodiment, the roller 16 is directly mounted on the pin 14. Alternatively, a rolling bearing or a plain bearing may be radially interposed. The roller 16 provides an axial cylindrical bore 16a mounted on an outer surface of the pin 14, and an axial cylindrical outer surface 16b radially opposed to the bore. The outer surface 16b of the roller forms a contact surface intended to bear against the associated cam of the internal combustion engine.

The roller 16 also provides two opposite radial frontal end faces 16c, 16d axially delimiting the bore 16a and the outer surface 16b. The roller 16 further provides a first annular chamfer or edge 16e delimited between the outer surface 16b and the end face 16c, and a second annular chamfer or edge 16f delimited between the outer surface and the other end face 16d. Each edge 16e, 16f is connected to the outer surface 16b and to the associated end face 16c or 16d.

The tappet body 12 is made in one part. In the disclosed example, the body 12 has a tubular form. The tappet body 12 provides a cylindrical axial outer surface and a cylindrical axial inner bore or surface. The inner surface delimits a cavity 28 inside which are located the insert 18 and the pin 14. The roller 16 axially protrudes outwards with respect to an upper face 12b of the tappet body 12. The tappet body 12 also provides a lower face 12c which delimits axially together with the upper face 12b the body.

The insert 18 is made in one part. The insert 18 may preferably be made of metal, by example steel, or be made of plastic material. The insert 18 is distinct from the tappet body 12. In the disclosed example, the insert 18 is entirely housed inside the cavity 28 delimited by the tappet body 12.

The insert 18 provides a base part or central core 30 and two side parts or lateral tabs 32, 34 extending from the core and facing each other. The tabs 32, 34 of the insert extend from the core 30 towards the upper face 12b of the tappet body. The insert 18 has in cross-section a U-shape. The roller 16 is disposed between the tabs 32, 34. A concave recess 36, 38 is provided at the free end of each tab to receive the pin 14. Both recesses 36, 38 extend through the tabs 32, 34 along the axis 14a and have the same diameter. Recesses 36, 38 form receiving housings adapted to receive the ends of the pin 14. Each end of the pin 14 is supported by one of the two tabs 32, 34. The pin 14 is supported by the insert 18. Referring to FIGS. 1 and 2, pin 14 abuts each of the first lateral tab 32 and the second lateral tab 34 such that the first lateral tab 32 and the second lateral tab 34 do not restrain the pin 14 from movement parallel to the central axis 12a and away from the central core 30 of the insert 18 but such movement is restrained by the means 40, 42 of the tappet body 12.

The tappet body 12 further provides means 40, 42 for axially blocking the pin 14 and the roller 16 relative to the body. The axial blocking means 40, 42 block the translation of pin 14 in a direction from the lower face 12c of the tappet towards the upper face 12b. The axial blocking means 40, 42 are integrally formed with the tappet body 12. In the illustrated example, these means 40, 42 are provided on the inner surface of the tappet body at the upper face 12b. The axial blocking means 40, 42 delimit receiving housings each facing one of the receiving housings 36, 38 of the insert to delimit together cylindrical bores for the ends of the pin 14. Alternatively, it could be possible to provide a spacer comprising cylindrical through-holes made into the thickness of the lateral tabs and facing one another, the ends of the pin 14 being fixed in the through-holes. In the illustrated example, the tappet body 12 is made from synthetic material, such as polyamide for example. The tappet body 12 is advantageously formed by moulding. Alternatively, the tappet body 12 may be made of metal, for example in an economic way by cutting, stamping and folding.

The device 10 further provides an annular retaining washer 44 housed inside the cavity 28 delimited by the tappet body 12 and mounted into axial contact with the insert 18. The washer 44 enables to retain the unit formed by the insert 18, the pin 14 and the roller 16 into the tappet body 12. The washer 44 axially abuts against the insert 18 axially on the side opposite to the roller 14 and the pin 16. The washer 44 axially abuts against the core 30 of the insert. In the disclosed example, the washer 44 is a flat washer. Alternatively, an elastic washer, for instance a wavy washer, may be provided in order to exert a permanent axial preload on the insert 18. The washer 44 may be open in the circumferential direction.

A plurality of protrusions 46 are formed on the inner surface of the tappet body 12 and extends radially inwards to axially block the washer 44 into the body. The protrusions 46 are integrally formed with the tappet body 12. The protrusions 46 are regularly spaced apart in the circumferential direction. The washer 44 is in axial contact against the insert 18 on one side and in axial contact with the protrusions 46 of the tappet body on the other side. Alternatively, an annular protrusion may be provided on the inner surface of the tappet body 12.

In this example, the insert 18 is supported by the tappet body 12 with the aid of the washer 44. Alternatively, the insert 18 may be supported directly by the tappet body 12, without interposition of a washer, for example by forming radial protrusions on the inner surface of the tappet body which cooperate with the insert.

Figure 3:
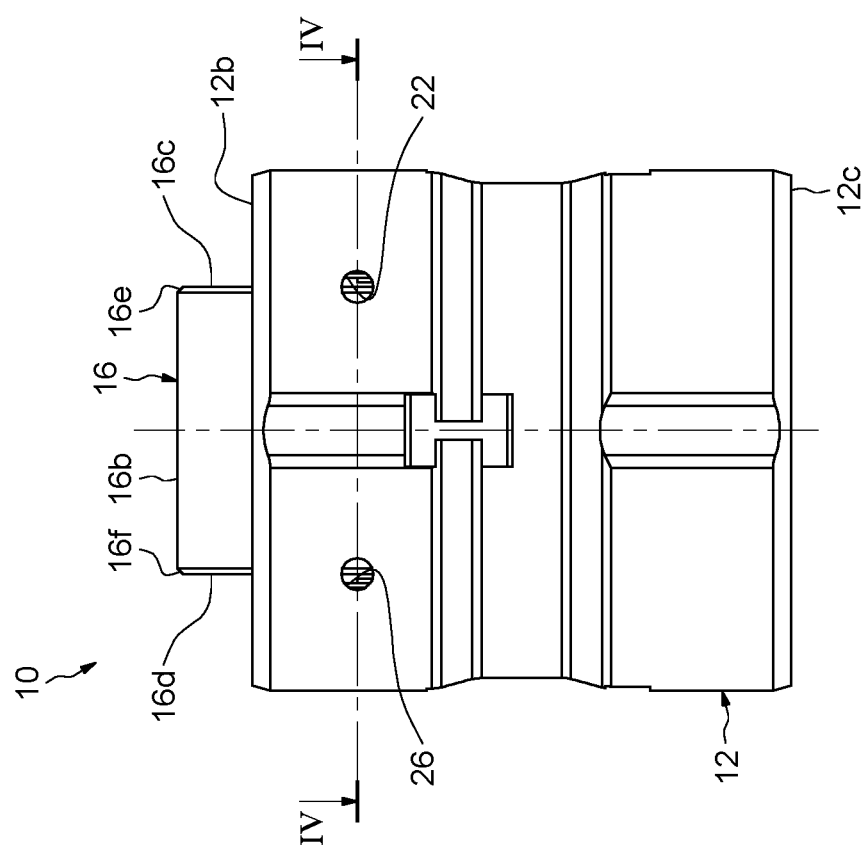
FIG. 3 is a front view of the device of FIG. 1.
Figure 4:
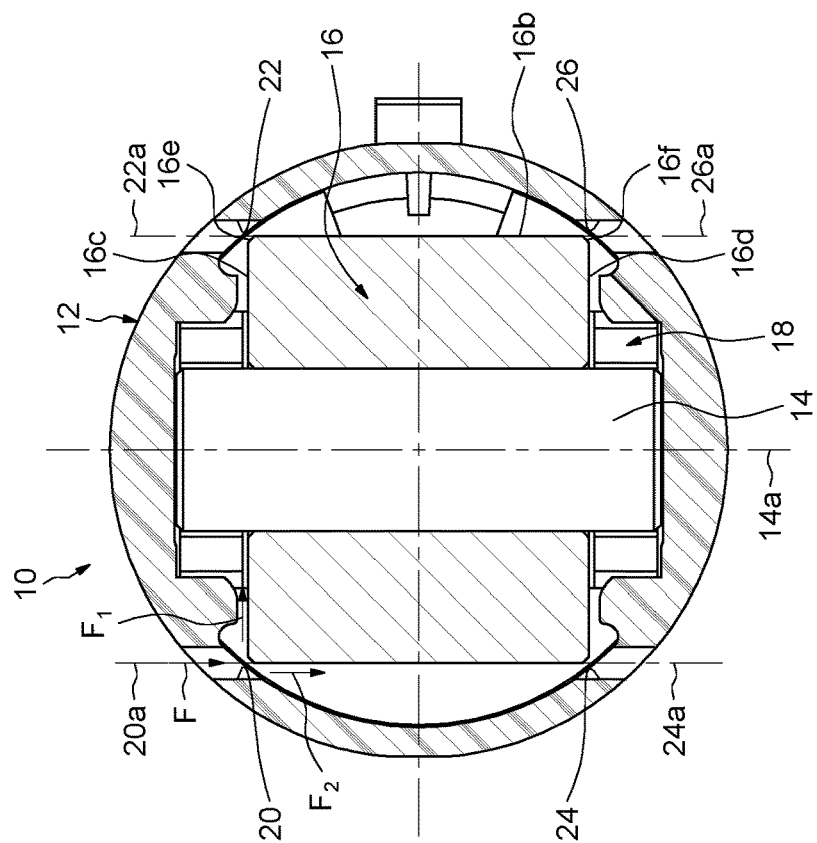
FIG. 4 is a section on IV-IV of FIG. 3.

As previously mentioned, lubricant supply through-holes 20 to 26 are formed on the tappet body 12 as shown on FIGS. 3 and 4. Each through-hole 20 to 26 is formed into the thickness of the tappet body 12. Each through-hole 20 to 26 extends from the outer surface of the tappet body 12 to the inner surface of the body. The through-holes open onto the inner surface. The through-holes 20 to 26 are spaced apart from the upper face 12b of the tappet body. In the disclosed example, each through-hole has a cylindrical shape. For example, the diameter of the through-holes 20 to 26 may be from 0.5 mm to 3 mm. Alternatively, the through-holes may have any other different profile, for example a rectangular or a square one. In this example, the through-holes 20 to 26 are identical.

As shown more clearly on FIG. 4, the through-holes 20, 22 are disposed on the tappet body 12 to locally face the first edge 16e of the roller. The through-holes 20, 22 face one another. The through-holes 20, 22 are symmetrical with respect to a transverse axial plane containing the axis 14a of the roller. Each through-hole 20, 22 has an axis 20a, 22a oriented towards the edge 16e of the roller. The axis of each through-hole intersects the edge 16e. Each through-hole 20, 22 locally faces both the outer surface 16b of the roller and the outer surface of the pin 14. A part of each through-hole 20, 22 faces the outer surface 16b of the roller and the other part of the hole is axially offset outwards relative to the end face 16c with respect to the axis 14a.

Similarly, the through-holes 24, 26 locally face the second edge 16f of the roller. The through-holes 24, 26 face one another. The through-holes 24, 26 are symmetrical with respect to the transverse axial plane containing the axis 14a of the roller. The through-holes 24, 26 are symmetrical to the through-holes 20, 22 with respect to a transverse axial plane passing through the centre of the roller 16. Each through-hole 24, 26 has an axis 24a, 26a oriented towards the edge 16f of the roller. The axis of each through-hole intersects the edge 16f. Each through-hole 24, 26 locally faces both the outer surface 16b of the roller and the outer surface of the pin 14. A part of each through-hole 24, 26 faces the outer surface 16b of the roller and the other part of the hole is axially offset outwards relative to the end face 16d with respect to the axis 14a.

For lubricating the device 10, a flow of lubricant, such as oil, is introduced into each of the lubricant supply through-holes 20 to 26 of the tappet body. For the sake of clarity of FIG. 4, only the flow F coming from the through-hole 20 is illustrated.

The flow F is directed towards the edge 16e of the roller, impacts the edge and is divided into two separate flows $F_1$ and $F_2$. The flow $F_1$ is directed towards the outer surface of the pin 14 while the flow $F_2$ is directed towards the outer surface 16b of the roller. The flow $F_1$ is caused to flow towards the pin 14 between the end face 16c of the roller and a part of the inner surface of the tappet body facing the end face. The flow $F_2$ flows along the outer surface 16b of the roller.

The supply through-hole 20 enables the lubrication of the outer surface 16b of the roller as well as the rolling contact area between bore 16a of the roller and the pin 14. In the illustrated example, since the axis 20a of the through-hole 20 intersects the edge 16e of the roller, the supplied flow F of lubricant is split into equal individual flows $F_1$ and $F_2$ at this edge. Alternatively, according to the orientation of the supply through-hole 20 with respect to the edge 16e of the roller, the flow F may be split into two individual flows $F_1$ and $F_2$ in a predetermined ratio.

Figure 5:
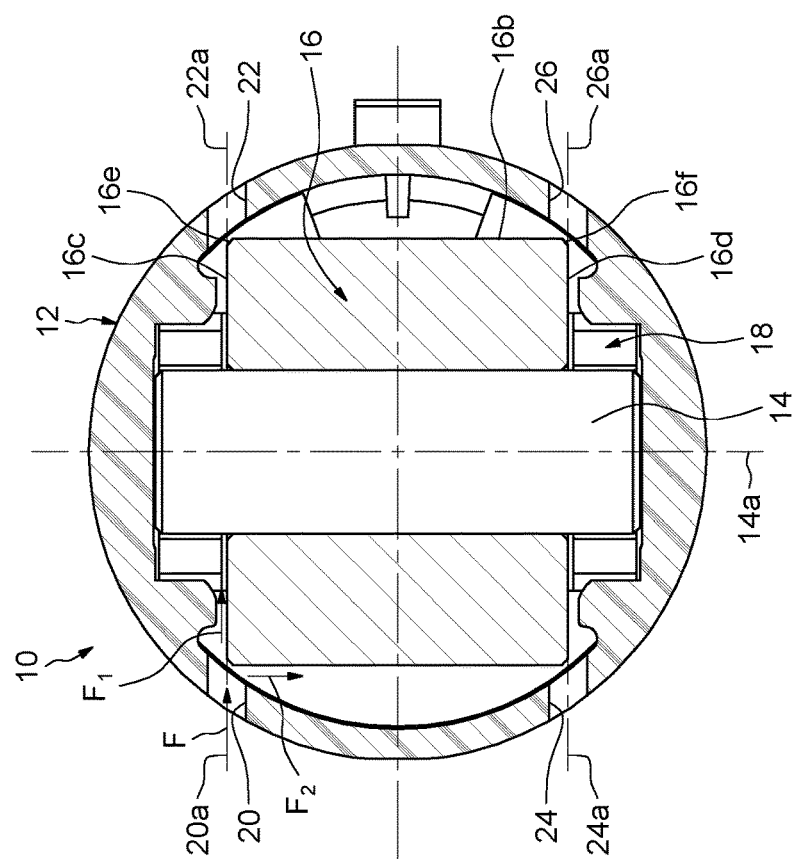
FIG. 5 is a section of a cam follower roller device according to a second example of the invention.

In this example, the through-holes 20 to 26 of the tappet body extends radially with regard to the axis 14a of the roller. Alternatively, it is possible to foresee another orientation of the through-holes. For example, in the second example illustrated on FIG. 5, in which identical parts are given identical references, the through-holes 20 to 26 of the tappet body extends axially with regard to the axis 14a of the roller.

In this example, each through-hole 20, 22 locally faces the edge 16e and the end face 16c of the roller. A first portion of each through-hole 20, 22 faces the end face 16c and the other part of the hole is radially offset outwards relative to the outer surface 16b of the roller with respect to the axis 14a. Similarly to the first example, the axis 20a, 22a of each through-hole 20, 22 intersects the edge 16e of the roller. Each through-hole 24, 26 locally faces the edge 16f and the end face 16d of the roller. A second portion of each through-hole 24, 26 faces the end face 16d and the other part of the hole is radially offset outwards relative to the outer surface 16b of the roller with respect to the axis 14a. The axis 24a, 26a of each through-hole 24, 26 intersects the edge 16f of the roller. In this example, the through-holes 20, 24 and 22, 26 respectively face one another.

Applicants respectfully submit that no new matter is added to the application by the amendments to the specification. As such, Applicants respectfully request that the Examiner review and approve the amendments to the specification.

In another variant, it could be possible to foresee another orientation of the through-holes 20 to 26 of the tappet body taken within an angular range of about 90 degrees delimited by the first and second positions as shown in the illustrated examples.

In the described examples, the through-holes 20 to 26 of the tappet body extend into a radial plane of the device perpendicular to the axis 12 of the body and passing through the roller 16. Alternatively, the lubricant supply through-holes may be tilted with respect to the radial plane in order to each delimit with the plane a clockwise or counter clockwise angle.

The invention has been illustrated on the basis of a cam follower roller device comprising an insert secured to the tappet body and supporting the pin. Alternatively, it could be possible to directly mount the pin on the tappet body, for example by providing through-holes into the thickness of the body. In this case, the device is deprived of such insert.

The invention claimed is:

1. A cam follower roller device comprising:
   a tappet body having an inner surface delimiting a cavity therein, the tappet body also defining a central axis, the tappet body having an upper face through which a roller protrudes, the tappet body having a lower face located opposite from the upper face,
   an insert located within the cavity and having a central core and a first lateral tab and a second lateral tab,
   a pin located in the cavity of the tappet body and defining a pin axis which is perpendicular to the central axis, the first lateral tab including a first upper end located opposite from the central core and the second lateral tab having a second upper end located opposite from the central core, the first lateral tab having a first recess in the first upper end and the second lateral tab having a second recess in the second upper end, the first recess and the second recess being configured to receive the pin, the first lateral tab and the second lateral tab providing support for the pin against force acting in a direction from the upper face toward the lower face and parallel to the central axis, the first lateral tab does not fully encircle an outer pin surface, the second lateral tab does not fully encircle the outer pin surface, and the tappet body including an axial blocking feature, the axial blocking feature including a first end, a second end, and a curved central portion disposed between the first and second ends, each of the first and second ends respectively extending from the inner surface in a respective direction perpendicular to the pin axis, the curved central portion extends from the first and second ends portions in a direction from the lower face to the upper face such that the curved central portion is exterior to the cavity, the roller mounted on the pin and provided with an outer surface and with a first end face and a second end face axially delimiting the outer surface, wherein at least one lubricant supply through-hole is formed into a thickness of the tappet body, the at least one lubricant supply through-hole lying in a plane perpendicular to the central axis, the at least one lubricant supply through-hole being perpendicular to the pin axis, and the at least one lubricant supply through-hole locally faces one of a first and second edge of the roller delimited between the outer surface and one of the first end face and the second end face such that the at least one lubricant supply through-hole has a first portion that faces the outer surface of the roller and a second portion which is axially offset outwards along the pin axis relative to the one of the first end face and the second end face.

2. The device according to claim 1, wherein an axis of the at least one lubricant supply through-hole is oriented towards the one of the first edge and the second edge of the roller.

3. The device according to claim 1, wherein the at least one lubricant supply through-hole is spaced apart from the upper face of the tappet body.

4. The device according to claim 1, wherein the at least one lubricant supply through-hole extends along the plane perpendicular to the central axis of the tappet body.

5. The device according to claim 1, wherein the at least one lubricant supply through-hole comprises a first lubricant supply through hole and a second lubricant supply through hole formed into the thickness of the tappet body, the first lubricant supply through-hole locally facing the first edge of the roller delimited between the outer surface and one of the first and second end face, the second lubricant supply through-hole locally facing the second edge of the roller delimited between the outer surface and another of the first and second end face.

6. The device according to claim 5, wherein the at least one lubricant supply through-hole further comprises a third lubricant supply through hole and a fourth lubricant supply through hole.

7. The device according to claim 6, wherein the first and second lubricant supply through-holes face the third and fourth lubricant supply through-holes, respectively.

8. The device according to claim 6, wherein the first, second, third, and fourth lubricant supply through-holes are symmetrical relative to an axial plane of the device passing through a centre of the roller.

9. The device according to claim 1, wherein the pin is mounted on the tappet body.

10. A method for lubricating a cam follower roller device, the method comprising the steps of:
providing the cam follower device of claim 1;
directing at least one flow of lubricant emerging from the at least one lubricant supply through-hole formed into the thickness of the tappet body towards one of the first and second edge of the roller delimited between the outer surface and one of the first and second end faces of the roller, and impacting the one of the first and second edge so that a first part of the flow is caused to flow towards the pin and that a second part of the at least one flow is caused to flow towards the outer surface of the roller.

11. A cam follower roller device comprising:
a tappet body having an inner surface delimiting a cavity therein, the tappet body also defining a central axis, the tappet body having an upper face through which a roller protrudes, the tappet body having a lower face located opposite from the upper face,
an insert located within the cavity and having a central core and a first lateral tab and a second lateral tab,
a pin located in the cavity of the tappet body and defining a pin axis which is perpendicular to the central axis, the first lateral tab including a first upper end located opposite from the central core and the second lateral tab having a second upper end located opposite from the central core, the first lateral tab having a first recess in the first upper end and the second lateral tab having a second recess in the second upper end, the first recess and the second recess being configured to receive the pin, the first lateral tab and the second lateral tab providing support for the pin against force acting in a direction from the upper face toward the lower face and parallel to the central axis, the first lateral tab does not fully encircle an outer pin surface, the second lateral tab does not fully encircle the outer pin surface, and
the tappet body including an axial blocking feature, the axial blocking feature including a first end, a second end, and a curved central portion disposed between the first and second ends, each of the first and second ends respectively extending from the inner surface in a respective direction perpendicular to the pin axis, the curved central portion extends from the first and second ends portions in a direction from the lower face to the upper face such that the curved central portion is exterior to the cavity,
the roller mounted on the pin and provided with an outer surface and with a first end face and a second end face axially delimiting the outer surface, wherein
at least one lubricant supply through-hole is formed into a thickness of the tappet body, the at least one lubricant supply through-hole lying in a plane perpendicular to the central axis, the at least one lubricant supply through-hole being parallel to the pin axis, and the at least one lubricant supply through-hole locally faces one of a first edge of the roller and a second edge of the roller such that the at least one lubricant supply through-hole has a first portion that faces one of the first end face of the roller and second end face of the roller and a second portion which is radially offset outwards from the pin axis past an outer pin surface.

12. A method for lubricating a cam follower roller device, the method comprising the steps of:
providing the cam follower device of claim 11;
directing at least one flow of lubricant emerging from the at least one lubricant supply through-hole formed into the thickness of the tappet body towards one of the first and second edge of the roller delimited between the outer surface and one of the first and second end faces of the roller, and impacting the one of the first and second edge so that a first part of the at least one flow is caused to flow towards the pin and that a second part of the at least one flow is caused to flow towards the outer surface of the roller.

* * * * *